United States Patent [19]
Reid et al.

[11] Patent Number: 6,079,434
[45] Date of Patent: Jun. 27, 2000

[54] PROPANE REGULATOR WITH A BALANCED VALVE

[75] Inventors: Roney A. Reid, Boardman, Ohio; Anthony J. Progar, Jr., Paris, Pa.

[73] Assignee: Marsh Bellofram Corporation, Newell, W. Va.

[21] Appl. No.: 09/123,608

[22] Filed: Jul. 28, 1998

[51] Int. Cl.⁷ .................................................. G05D 16/02
[52] U.S. Cl. ................... 137/14; 137/484.8; 137/505.18; 137/505.37
[58] Field of Search ........................... 137/484.8, 505.18, 137/505.37

[56] References Cited

U.S. PATENT DOCUMENTS

| | | | |
|---|---|---|---|
| 2,599,577 | 6/1952 | Norgren | 137/484.8 |
| 2,707,966 | 5/1955 | Taplin | 137/505.18 |
| 2,890,713 | 6/1959 | Semon | 137/484.8 |
| 3,643,683 | 2/1972 | Semon | 137/484.8 |
| 5,381,819 | 1/1995 | Gotthelf | 137/484.8 |

*Primary Examiner*—Stephen M. Hepperle
*Attorney, Agent, or Firm*—Fay, Sharpe, Fagan, Minnich & McKee, LLP

[57] ABSTRACT

The invention relates to a pressure regulator for propane and liquefied petroleum with a balanced valve. An inlet port (10) receives supply pressure and an outlet port (14) receives output pressure. A threaded shaft (28) engages a pocket in a spring button (20). A diaphragm assembly (22) engages the bottom of a range spring (24). A T-handle (26) is rotated to move the spring button (20) downward, compressing the range spring (24) which creates a net downward force on the diaphragm assembly (22). A valve mechanism (12) includes a supply seat (30), a supply valve (34), a balance piston (32), and a pintle interconnection (36). The supply valve (34) moves off of the supply seat (30) as the downward force is exerted on the diaphragm assembly (22), and supply pressure fills the outlet port (14). An aspirator tube (39) transfers supply pressure from the outlet port (14) to the diaphragm assembly (22) resulting in a net upward force on the diaphragm assembly (22) as a function of outlet pressure times diaphragm assembly (22) area. A balanced diaphragm (42) and an o-ring (44) create a redundant seal and prevent the effect of supply pressure on output pressure by equating the net upward and downward force on the valve mechanism (12) due to supply pressure. The o-ring (44) dampens unwanted valve (12) and diaphragm assembly (22) oscillation.

19 Claims, 1 Drawing Sheet

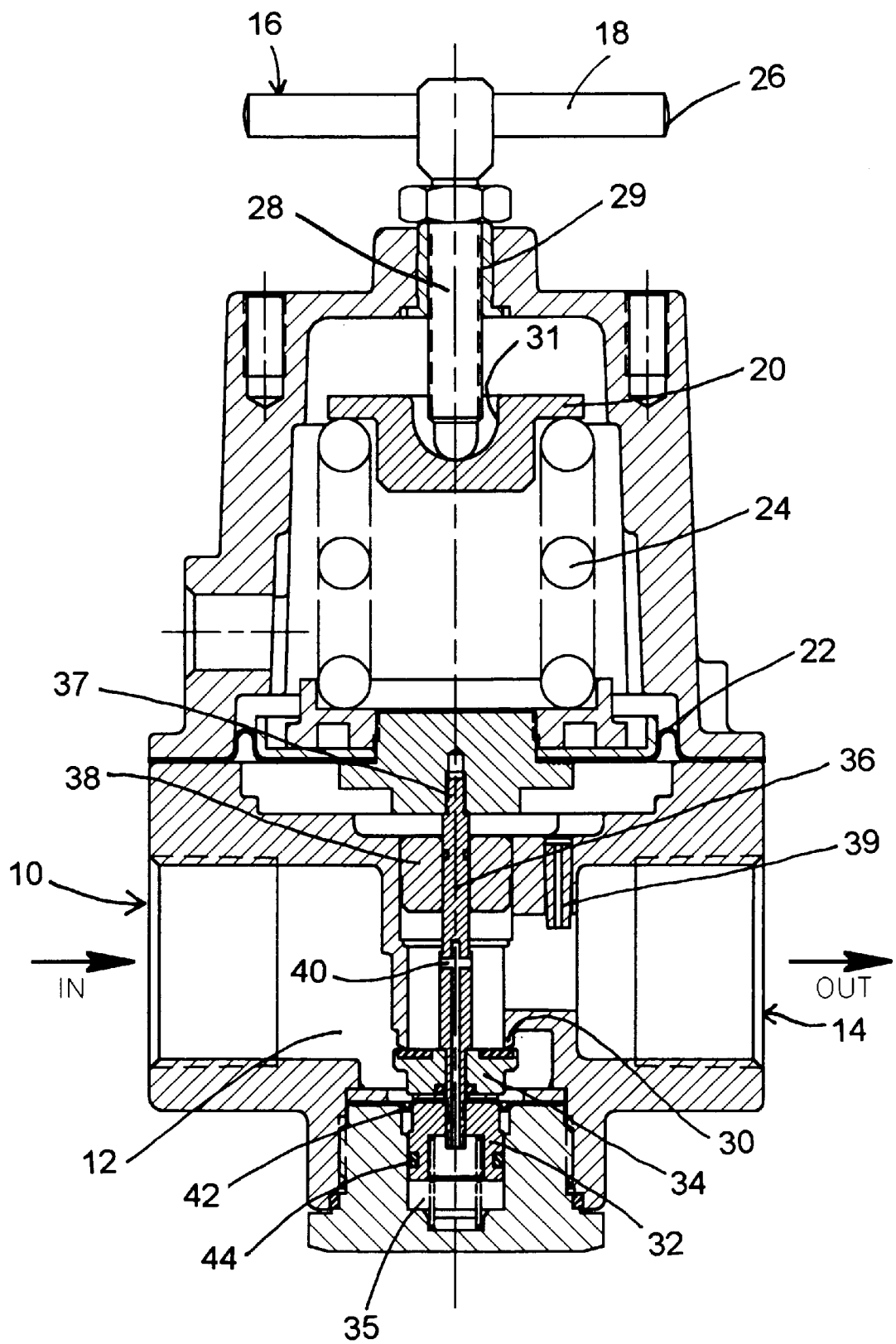

PROPANE REGULATOR WITH A BALANCED VALVE

BACKGROUND OF THE INVENTION

The present invention relates generally to gas regulators. It finds particular application in propane and liquid petroleum regulators and will be described with particular reference thereto.

Conventionally, propane regulators include inlet and outlet ports and a valving mechanism. A pressure control assembly adjusts the valving mechanism to regulate pressure. Changes in supply pressure redistribute the balance of forces, thus affecting the outlet pressure. Thus, a change in tank pressure affects the regulated outlet pressure of the propane or liquid petroleum gas. The pressure control assembly is manually adjusted to maintain the regulated outlet pressure and stabilize the forces on a diaphragm assembly.

During operation of the regulator, the valve mechanism tends to oscillate. These oscillations, which are common in gas regulators, are typified by honking or humming sounds emitted from the regulator. These oscillations or vibrations are not only annoying, but also reduce the working life of the product due to component wear. These oscillations or vibrations also cause outlet pressure fluctuations.

The present invention provides a new and improved propane regulator that overcomes the above referenced problems and others.

SUMMARY OF THE INVENTION

The present invention relates to a pressure regulator. More particularly, it relates to a pressure regulator for propane and liquefied petroleum which includes an inlet port which receives propane or liquefied petroleum gas at a supply pressure, an outlet port through which the gas is discharged as an output, and a valve mechanism disposed between the inlet port and the outlet port to control the output pressure. The valve mechanism includes a supply seat located between the inlet port and the outlet port, a supply valve which engages the supply seat, and a pressure set point adjustment. The pressure set point adjustment includes a handle assembly for extending and retracting a shaft under operator control to set a regulated pressure, a spring button engaged by the shaft, and a range spring having a first end and a second end. The first end of the range spring engages the spring button. The pressure set point adjustment further includes a diaphragm assembly which is engaged by the second end of the range spring. As the handle assembly advances the shaft and the spring button downward, the range spring is compressed creating an operator adjustable downward force on the diaphragm assembly. The pressure set point adjustment further includes a pintle interconnecting the supply valve, the balance piston, and the diaphragm. The supply valve moves relative to the supply seat in response to changes in the pressure exerted on the diaphragm by the range spring altering a flow of the gas from the inlet port to the outlet port. The pressure regulator further includes an aspirator tube that communicates the outlet pressure from the outlet port to an opposite side of the diaphragm assembly to counter balance the force applied to the diaphragm assembly by the range spring. The pressure regulator further includes a balanced valve which includes a balance piston movably mounted in a piston cylinder below the supply valve and connected to the pintle, a balanced diaphragm located on a top surface of the balance piston and below the supply valve, an o-ring positioned between the balance piston and the piston cylinder, and a pressure equalization passage between the outlet port and the piston cylinder below the balance piston.

In accordance with another aspect of the present invention, the invention relates to a propane or liquefied petroleum pressure regulator including an inlet port connected to a source of propane or liquefied petroleum to receive gas therefrom at a varying supply pressure. The pressure regulator further includes a supply valve and a supply seat in fluid communication with the inlet port for selectively passing gas from the inlet port to an outlet port. The supply valve includes a first surface area that is acted upon by the gas at the inlet pressure to bias the supply valve toward the supply seat in accordance with the supply pressure and the first area. The supply valve includes a second surface area that is acted upon through the supply seat by the gas at an outlet port pressure to bias the supply valve away from the supply seat in accordance with the outlet port pressure and the second area. The pressure regulator further includes a pressure set point adjustment which biases the supply valve away from the supply seat with a biasing force set by an operator in accordance with a selected outlet port pressure. The pressure regulator also includes a first fluid pressure feedback passage for feeding back gas from the outlet port at the outlet port pressure to the pressure set point adjustment, counteracting the force set by the operator to bias the supply valve toward the supply seat in accordance with the fed back outlet port pressure. The pressure regulator also includes a balance element having a first surface with a first area and a second opposite surface with a second area. The balance element first surface area is substantially the same as the supply valve first surface area and the balance element second surface area is substantially the same as the supply valve second surface area. The balance element first surface is in fluid communication with the inlet port such that the balance element first surface is acted upon by the supply pressure. The regulator further includes a second fluid pressure feed back passage for feeding back gas from the outlet port at the outlet port pressure to the balance element second surface such that the fed back outlet pressure acts on the balance element second surface. The regulator further includes a mechanical connection between the balance element and the supply valve such that the supply valve biases away from the supply seat in accordance with the supply pressure and the first surface area and is biased toward the supply seat in accordance with the fed back outlet port pressure and the second surface area.

In accordance with another aspect of the present invention, the invention relates to a pressure regulator for propane and liquefied petroleum including an inlet port for receiving supply pressure, an outlet port receiving output pressure, and a pressure set point adjustment. The pressure set point adjustment includes a T-handle adjustment including a rotatable T-handle and a threaded shaft, a spring assembly which is engaged by the threaded shaft, and a diaphragm which engages the spring assembly. The T-handle is rotated to move the spring assembly downward, compressing the spring, and creating a net downward force on the diaphragm. The pressure regulator also includes a valve mechanism which includes a supply seat located between the inlet port and the outlet port, a supply valve which engages the supply seat, a balance piston which is positioned below the supply valve, and a pintle interconnection. The pintle interconnection threads to and connects the supply valve and the balance piston to the diaphragm. The supply valve moves off of the supply seat as the downward force is exerted on the diaphragm. Supply pressure fills the outlet port as the supply valve moves off of the supply seat. The regulator also includes a balanced valve which includes a balanced diaphragm located on a top surface of the balance piston and below the supply valve, and an o-ring positioned within the balance piston. The regulator also includes an aspirator tube which transfers supply pressure from the outlet port to the diaphragm resulting in a net upward force on the diaphragm as a function of outlet pressure times diaphragm area.

In accordance with another aspect of the present invention, a method for regulating pressure for propane and liquefied petroleum is provided. The method includes feeding propane or liquefied petroleum gas as a supply pressure to a valve and a seat, such that the gas acts on a lower surface of the valve to bias the valve toward the seat with a first force. The method also includes compressing a spring to create a downward second force on a first movable seal. The method also includes moving the valve off the seat in response to the second force and against the first force allowing the gas to flow between the valve and the seat to create an output gas pressure downstream of the seat, which output gas pressure acts through the seat to bias the valve away from the seat with a third force. The method further includes operating on a second movable seal that is connected to the valve with the gas at the supply pressure to bias the second movable seal and the valve with a fourth force, which fourth force is equal and opposite to the first force. The method also includes feeding back the gas at the output pressure to the first seal to create an upward fifth force on the first movable seal.

The method also includes feeding back the gas as the output pressure to the second seal to bias the second movable seal and the valve with a sixth force which sixth force is equal and opposite to the third force. The method further includes moving the valve relative to the seat until the second and fifth forces counter balance.

The method further includes compressing the valve against the seat via a spring to create an upward seventh force on the valve.

One advantage of the present invention resides in reduction of the vibrations and oscillations associated with the propane tanks.

Another advantage of the present invention is that it reduces honking and humming.

Another advantage of the present invention is that it creates a redundant seal.

Yet another advantage resides in maintained output pressure stability.

Still other advantages and benefits of the invention will become apparent to those skilled in the art upon a reading and understanding of the following detailed description.

BRIEF DESCRIPTION OF THE DRAWINGS

The invention may take form in various components and arrangements of components, and in various steps and arrangements of steps. The drawing is only for purposes of illustrating a preferred embodiment and is not to be construed as limiting the invention.

The FIGURE shows a side sectional view of a propane regulator with a balanced valve in accordance with a preferred embodiment of the present invention.

DETAILED DESCRIPTION OF THE PREFERRED EMBODIMENT

With reference to the FIGURE, a propane regulator includes an inlet port 10, a valving mechanism 12, and an outlet port 14. A pressure set point adjustment 16 adjusts the valving mechanism 12 to control the pressure of the propane at the outlet port 14 of the regulator. In the preferred embodiment, the pressure set point adjustment 16 includes a T-handle assembly 18, a spring button 20, a diaphragm assembly 22, and a range spring 24. The T-handle assembly 18 includes a T-handle 26 mounted on a threaded shaft 28. The threaded shaft 28 threads through a bushing 29 located on the top of the regulator. The bottom of the threaded shaft 28 engages a pocket 31 in the top of the spring button 20. The spring button 20 engages a first end of the range spring 24. The second end of the range spring 24 engages the diaphragm assembly 22.

The regulator utilizes a mechanical force balance approach for pressure regulation. With supply pressure present at the inlet port 10, the T-handle 26 is turned causing the threaded portion 28 to move the spring button 20 relative to the diaphragm assembly 22 thus compressing the range spring 24. The compression of the range spring 24 controls a downward mechanical biasing force on the diaphragm assembly 22.

The valving mechanism 12 includes a supply seat 30, a balance piston 32, a supply valve 34, which is seated above the balance piston 32, and a pintle interconnection 36 which connects to the balance piston 32 and extends through the supply valve 34. A balance piston spring 35 compresses the supply valve 34 against the supply seat 30 so that supply pressure does not move from the inlet port 10 to the outlet port 14 when the T-handle 26 is backed off and the range spring 24 is not compressed. The pintle interconnection 36 is threaded into the diaphragm assembly 22 and connects the diaphragm assembly 22 to the supply valve member 34. The pintle interconnection 36 passes through an o-ring 37 which is engaged with the inside opening of a pintle guide bushing 38 located in the regulator between the inlet port 10 and the outlet port 14. This arrangement is a tied diaphragm or fail safe arrangement to ensure that supply pressure does not move from the inlet port to the outlet port, once equilibrium pressure is achieved.

As the range spring 24 is compressed, it creates an increased net downward force on the diaphragm assembly 22. The diaphragm assembly 22 moves the pintle interconnection 36 downward which, in turn, moves the supply valve member 34 downward off the supply seat 30. As the supply valve 34 moves away from the supply seat 30, the supply pressure moves from the inlet port 10 into the outlet port 14. The pressure in the outlet port 14 is then communicated or fed back to the diaphragm assembly 22 through an aspirator tube 39 or similar pressure equalization passage positioned between the outlet port 14 and the diaphragm assembly 22 in the regulator. The aspirator tube 39 has a restricted orifice to damp the speed of pressure equalization across it.

As pressure increases in the outlet port 14, a net upward force is then exerted on the diaphragm assembly 22 by the gas fed back through the aspirator tube 39. The force is a function of the outlet pressure times the diaphragm area. Once the net upward force on the diaphragm assembly 22 from the outlet pressure builds to equal the net downward force from the range spring 24, the supply valve 34 contacts the supply seat 30 at the selected or equilibrium pressure.

When a flow volume at the outlet port 14 increases, the pressure at the outlet port 14 drops and the pressure fed back through the aspirator tube 39 decreases. The net upward force on the diaphragm assembly 22 then decreases as a result of a pressure reduction in the outlet port 14. As described above, the supply valve 34 is pushed by the range spring 24 away from the supply seat 30 allowing supply pressure to fill the outlet port 14. This extension of the range spring 24 reduces the net downward force on the diaphragm assembly 22 until it balances the reduced net upward force on the diaphragm assembly 22 of the gas fed back through the aspirator tube 39 to reestablish equilibrium. In this manner, the flow rate increases to meet the demand. As the range spring 24 extends, the pressure it exerts decreases due to a phenomenon called droop. Droop is a condition where the range spring 24 extends to move the supply valve 34 away from the supply seat 30 to meet the flow demand. The aspirator tube 39 counteracts droop by allowing a false pressure to be sensed at the diaphragm assembly 22. As gas flows past the end of the aspirator tube 39, the flow stream pulls gas molecules from the diaphragm assembly 22 through the aspirator tube 39 reducing the sensed pressure at the diaphragm assembly 22. This reduced force allows the range spring 24 to extend further causing the supply valve 34 to move further away from the supply seat 30 allowing more supply pressure to fill the outlet port 14, thus reducing the effect of droop.

When demand decreases, the flow volume at the outlet port 14 decreases, the pressure at the outlet port 14 increases and the pressure fed back through the aspirator tube 39 increases. The net upward force on the diaphragm assembly 22 increases as a result of the pressure increase in the outlet port 14. The additional upward force on the diaphragm assembly 22 urges the supply valve 34 upward toward the supply seat 30. The diaphragm/valve connection ensures that the supply valve 34 and supply seat 30 interface is with sufficient pressure to be leak-tight. Similarly, if the T-handle 26 is rotated counter-clockwise raising the threaded shaft 28, a net upward force would result on the diaphragm assembly 22 due to the upward movement of the range spring 24 thus pulling the supply valve 34 upward toward the supply seat 30.

To avoid the input pressure fluctuations affecting the outlet pressure, the regulator further uses a balanced valve assembly which counterbalances both (1) the forces acting in an upward direction on a lower surface of the supply valve 34 due to the supply pressure and (2) the downward forces on the supply valve 34 due to the output pressure. A balance diaphragm 42 is located between the supply valve 34 and the balance piston 32. A balance o-ring 44 is located within the balance piston 32. The circumferences, hence the areas bound by the supply seat 30, balance diaphragm 42 and balance o-ring 44 are equal. Hence, the upward force on the supply valve 34 (input pressure times valve area) is the same as the downward pressure on the balance piston 32 (input pressure times effective cross-sectional area).

A fluctuation in supply pressure, such as an increase in supply pressure, would result in a decrease in outlet pressure without a balanced valve arrangement. By definition, a balanced valve prevents supply pressure of a pressure regulator from affecting the output pressure. In this application, the change in tank pressure will not have an effect on the regulated pressure of the propane or LP, liquid petroleum, gas.

A balance valve prevents the effect of the supply pressure on the output pressure by equating the net upward force on the supply valve 34 due to supply pressure to the net downward force on the balance piston 32 due to the supply pressure thereby resulting in a net force equaling zero.

The net upward force on the supply valve 34 due to supply pressure is defined by the supply seat area 30 while the net downward force due to supply pressure is defined by the balance diaphragm area 42; these areas are equal resulting in a net force of zero on the supply valve 34.

There is also a net downward force on the supply valve 34 due to output pressure, which force is the product of the output pressure and the upper surface area of the supply valve 34 visible through the supply seat 30. To balance the output pressure effect on the supply valve 34, the output pressure is communicated to the bottom of the balance piston 32 through a passage 40 in the pintle interconnection 36. The net upward force on the balance piston 32 due to output pressure is defined by the balance piston 32 and o-ring 44 area. The area of the o-ring 44 and the area of the supply seat 30 are equal resulting in a net force of zero on the supply valve 34 due to the output pressure.

The convoluted balance diaphragm 42 maintains a constant area during supply valve 34 travel, that is the diaphragm 42 does not stretch significantly, assuring that the area of, hence, the force on, the convoluted balance diaphragm 42 remain unchanged as the supply valve 34 moves with relation to the supply seat 30 position.

The redundant seals of the o-ring 44 and the convoluted balance diaphragm 42 ensure supply pressure gases do not leak to the outlet port 14.

The balance o-ring 44 serves a further purpose of dampening the valve mechanism 12 and the diaphragm assembly 22 under dynamic conditions including, but not limited to, fuel flow. The o-ring 44 drags on the side walls damping velocities of high frequency disturbances due to a phenomenon called friction damping. This friction damping prevents the valve mechanism 12 and the diaphragm assembly 22 from oscillating during operation of the regulator. These oscillations, which are common in gas regulators, can be identified by honking or humming sounds emitted from the regulator. These oscillations or vibrations reduce the working life of the product due to component wear. These oscillations or vibrations will also cause outlet pressure fluctuation.

The invention has been described with reference to the preferred embodiments. Obviously, modifications and alterations will occur to others upon a reading and understanding the preceding detailed description. It is intended that the invention be construed as including all such modifications and alterations insofar as they come within the scope of the appended claims or the equivalents.

Having thus described the preferred embodiment, the invention is now claimed to be:

1. A pressure regulator for propane and liquefied petroleum comprising:

an inlet port which receives one of propane and liquefied petroleum gas at a supply pressure;

an outlet port through which the gas is discharged as an output pressure;

a valve mechanism disposed between the inlet port and the outlet port to control the output pressure, said valve mechanism including:

a supply seat, said supply seat located between said inlet port and said outlet port;

a supply valve which selectively engages said supply seat;

a pressure set point adjustment including:

a handle assembly for extending and retracting a shaft under operator control to set a regulated pressure;

a spring button engaged by the shaft;

a range spring having a first end and a second end, said first end of said range spring engaging said spring button;

a diaphragm assembly engaged by said second end of said range spring such that as said handle assembly advances the shaft and the spring button downward, said range spring is compressed creating an operator adjustable downward force on said diaphragm assembly;

a pintle interconnecting said supply valve, a balance piston, and said diaphragm assembly such that said supply valve moves relative to said supply seat in response to changes in the force exerted on said diaphragm by the range spring altering a flow of the gas from the inlet port to said outlet port;

an aspirator tube that communicates the outlet pressure from said outlet port to an opposite side of said diaphragm assembly counter balancing the force applied to the diaphragm assembly by the range spring;

a balanced valve including:
   a balance piston, said balance piston movably mounted in a piston cylinder below said supply valve, the balance piston being connected to the pintle;
   a balanced diaphragm located on a top surface of said balance piston and below said supply valve;
   an o-ring positioned between said balance piston and the piston cylinder; and,
   a pressure equalization passage between the outlet port and the piston cylinder below the balance piston.

2. The pressure regulator of claim 1, wherein an upper surface of said balance diaphragm and a lower surface of said supply valve have a common cross-sectional area such that the inlet pressure acting on the supply valve lower surface and the balance diaphragm upper surface are equal and opposite.

3. The pressure regulator of claim 2, wherein said diaphragm is convoluted to maintain a constant area during travel.

4. The pressure regulator of claim 1, wherein a cross-sectional area at said balance o-ring and balance piston and a cross-sectional area of the supply seat are substantially such that the outlet pressure operating on the supply valve through the supply seat is balanced by the outlet pressure operating on the balance piston and o-ring.

5. The pressure regulator of claim 1, wherein said o-ring is compressed between the balance piston and the piston cylinder to dampen movement of said valve mechanism during flow conditions.

6. A propane or liquefied petroleum pressure regulator comprising:

an inlet port configured for connection to a source of one of propane and liquefied petroleum to receive gas therefrom at a varying supply pressure;

a supply valve and a supply seat in fluid communication with the inlet port for selectively passing gas from the inlet port to an outlet port, the supply valve having a first surface area that is acted upon by the gas at the inlet pressure to bias the supply valve toward the supply seat in accordance with the supply pressure and the first area and a second surface area that is acted upon through the supply seat by the gas at an outlet port pressure to bias the supply valve away from the supply seat in accordance with the outlet Port pressure and the second area;

a pressure set point adjustment which biases the supply valve away from the supply seat with a biasing force set by an operator in accordance with a selected outlet port pressure;

a first fluid pressure feedback passage for feeding back gas from the outlet port at the outlet port pressure to the pressure set point adjustment, the fed back outlet port pressure counteracting the force set by the operator to bias the supply valve toward the supply seat in accordance with the fed back outlet port pressure;

a balance element having a first surface with a first area and a second, opposite surface with a second area, the balance element first surface area being substantially the same as the supply valve first surface area and the balance element second surface area being substantially the same as the supply valve second surface area, the balance element first surface being in fluid communication with the inlet port such that the balance element first surface is acted upon by the supply pressure;

a second fluid pressure feed back passage for feeding back gas from the outlet port at the outlet port pressure to the balance element second surface such that the fed back outlet pressure acts on the balance element second surface;

a mechanical connection between the balance element and the supply valve such that the supply valve is biased away from the supply seat in accordance with the supply pressure and the first surface area and is biased toward the supply seat in accordance with the fed back outlet port pressure and the second surface area; and an annular sliding frictional damping element connected to the balance element for damping movement of the balance element in response to supply and outlet port pressure changes to limit a speed with which the supply valve moves relative to the supply seat in response to the supply and outlet port pressure changes as well as turbulent flow effects on the supply valve, the balance element and the mechanical connection.

7. The pressure regulator of claim 6 wherein the first and second fluid pressure feed back passages have restricted cross-sections to limit a speed at which the outlet port pressure is fed back to the pressure set point adjustment and the balance element to damp a speed with which the supply valve moves relative to the supply seat in response to outlet port pressure changes.

8. A pressure regulator for propane and liquefied petroleum comprising:

an inlet port, said inlet port receiving supply pressure;

an outlet port, said outlet port receiving output pressure;

a pressure set point adjustment including:
   a T-handle adjustment including a rotatable T-handle and a threaded shaft;
   a spring assembly, said threaded shaft engages said spring assembly;
   a diaphragm assembly, said diaphragm assembly engages said spring assembly; said T-handle is rotated to move said spring assembly downward, compressing said spring, and creating a net downward force on said diaphragm;

a valve mechanism including:
   a supply seat located between said inlet port and said outlet port;
   a supply valve which engages said supply seat;
   a balance piston which is positioned below said supply valve;
   a pintle interconnection, said pintle interconnection threads to and connects said supply valve and said balance piston to said diaphragm assembly, said supply valve moves off of said supply seat as said downward force is exerted on said diaphragm assembly, supply pressure fills said outlet port as said supply valve moves off of said supply seat;

a balanced valve including:
  a balanced diaphragm, said balanced diaphragm located on a top surface of said balance piston and below said supply valve, and
  an o-ring, said o-ring is positioned within said balance piston; and,
an aspirator tube, said aspirator tube transfers supply pressure from said outlet port to said diaphragm resulting in a net upward force on said diaphragm as a function of outlet pressure times diaphragm area.

9. The pressure regulator of claim 8 wherein said supply valve contacts said supply seat when said net upward force and said net downward force on said diaphragm assembly are equal.

10. The pressure regulator of claim 8, wherein said balance diaphragm area defines the net downward force on said supply valve due to supply pressure and said supply seat area defines the net upward force on said supply valve due to supply pressure, said balance diaphragm area and said supply seat area are equal resulting in a net force of zero on said supply valve.

11. The pressure regulator of claim 10, wherein said balance o-ring area defines the net upward force on said supply valve due to outlet pressure, said supply seat area defines the net downward force on the supply valve due to the outlet pressure, said balance o-ring area and said supply seat area are equal resulting in a net force of zero on said supply valve.

12. The pressure regulator of claim 8, wherein said diaphragm assembly is convoluted to maintain a constant area during travel so that the net upward force and net downward force upon said diaphragm assembly remain substantially unchanged as the supply valve moves relative to the supply seat position.

13. The pressure regulator of claim 8, wherein said balance diaphragm and said o-ring form redundant seals in said valve mechanism to prevent supply pressure gases from leaking from said inlet port to said outlet port.

14. The pressure regulator of claim 8, wherein said o-ring further serves to dampen said valve mechanism and said diaphragm assembly during flow conditions.

15. A method for regulating pressure for propane and liquefied petroleum comprising:
  (a) feeding propane or liquefied petroleum gas as a supply pressure to a valve and a seat, such that the gas acts on a lower surface of the valve to bias the valve toward the seat with a first force:
  (b) mechanically creating a downward second force on a first movable seal, said second force is equal and opposite to the first force;
  (c) moving the valve off the seat in response to the second force and against the first force allowing the gas to flow between the valve and the seat to create an output gas pressure downstream of the seat, which output gas pressure acts through the seat to bias the valve away from the seat with a third force;
  (d) operating on a second movable seal that is connected to the valve with the gas at the supply pressure to bias the second movable seal and the valve with a fourth force, which fourth force is equal and opposite to the first force;
  (e) feeding back the gas at the output pressure to the first seal to create an upward fifth force on the first movable seal;
  (f) feeding back the gas as the output pressure to the second seal to bias the second movable seal and the valve with a sixth force which sixth force is equal and opposite to the third force;
  (g) moving the valve relative to the seat until the second and fifth forces counter balance;
  (h) concurrently redundantly sealing the valve and using sliding frictional drag to damp movement of the valve to limit a speed at which the valve moves relative to the seat.

16. The method of claim 15 wherein the damping step includes:
  damping movement of the first seal and second seal.

17. The method of claim 15 further including:
  restricting the feeding back of gas in step (e) to limit a speed at which the second and fifth forces come to counter balance in step (g).

18. The method of claim 15 further including:
  restricting the feeding back of gas in step (f) to limit a speed at which the valve moves in step (g) in response to a change in the output pressure.

19. The method of claim 15 further including compressing the valve against the seat via a spring to create an upward seventh force on the valve.

* * * * *